United States Patent [19]
Hall

[11] Patent Number: 5,957,633
[45] Date of Patent: Sep. 28, 1999

[54] MULTIPLE FUNCTION INSERTS FOR PORT CUTTING TOOL

[75] Inventor: James H. Hall, Rockford, Ill.

[73] Assignee: Greenfield Industries, Augusta, Ga.

[21] Appl. No.: 09/088,103

[22] Filed: Jun. 1, 1998

Related U.S. Application Data

[62] Division of application No. 08/779,929, Jan. 6, 1997.

[51] Int. Cl.$^6$ ....................................................... B23B 51/00
[52] U.S. Cl. ............................ 408/187; 408/224; 407/113
[58] Field of Search ............................. 407/113; 408/57, 408/59, 224, 223, 229, 713

[56] References Cited

U.S. PATENT DOCUMENTS

| | | | |
|---|---|---|---|
| 4,293,252 | 10/1981 | Kress et al. | 408/224 |
| 4,440,531 | 4/1984 | Astle | 408/82 |
| 4,505,626 | 3/1985 | Benhase | 408/224 |
| 4,531,867 | 7/1985 | Benhase | 408/224 |
| 4,564,321 | 1/1986 | Kondo et al. | 407/36 |
| 4,586,858 | 5/1986 | Kubota | 408/224 |
| 4,618,296 | 10/1986 | Allaire et al. | 407/42 |
| 4,927,303 | 5/1990 | Tsujimura et al. | 408/223 |
| 5,066,173 | 11/1991 | Gaffan et al. | 408/59 |
| 5,069,093 | 12/1991 | Carswell | 82/1.11 |
| 5,092,718 | 3/1992 | Shallenberger | 408/188 |
| 5,173,013 | 12/1992 | Gorse et al. | 408/22 |
| 5,176,477 | 1/1993 | Noggle | 408/59 |
| 5,188,490 | 2/1993 | Muendlein et al. | 408/146 |
| 5,232,319 | 8/1993 | Satran et al. | 407/114 |
| 5,269,618 | 12/1993 | Meyer | 408/188 |
| 5,288,184 | 2/1994 | Heule | 408/223 |
| 5,382,118 | 1/1995 | Satran et al. | 407/42 |
| 5,383,750 | 1/1995 | Satran et al. | 407/113 |
| 5,421,679 | 6/1995 | Pantzar et al. | 407/114 |
| 5,441,370 | 8/1995 | Pantzar et al. | 407/113 |
| 5,443,335 | 8/1995 | Shimano et al. | 407/113 |
| 5,454,670 | 10/1995 | Noda et al. | 407/42 |
| 5,460,464 | 10/1995 | Arai et al. | 407/114 |
| 5,476,346 | 12/1995 | Lundstrom | 407/114 |
| 5,486,073 | 1/1996 | Satran et al. | 407/113 |
| 5,503,509 | 4/1996 | von Haas et al. | 408/188 |
| 5,516,242 | 5/1996 | Andronica | 408/59 |
| 5,542,795 | 8/1996 | Mitchell | 407/35 |

*Primary Examiner*—Andrea L. Pitts
*Assistant Examiner*—Mark Williams
*Attorney, Agent, or Firm*—Leydig, Voit & Mayer, Ltd

[57] ABSTRACT

A cutting tool for forming complex ports within metal workpieces. The present invention provides a cylindrical body to one end of which are attached indexable cutting inserts. One set of inserts is provided at a reduced diameter portion of the shaft for forming a boring section which enlarges and uniformly shapes the diameter of a pilot hole. A second set of inserts is provided at an enlarged diameter section of the shaft for performing multiple functions such as forming both the countersink and the spot face areas of the port. Each set of cutting inserts is substantially equidistantly disposed about the circumference of the shaft to reduce the chatter or deflection of the porting tool and therefore allow a port to be formed in adherence with very tight tolerances. In addition, since at least two inserts are provided at each diameter, the axial feed rate of the porting tool is relatively high in that a full revolution of the tool is not required to form a cut as is required by prior art porting tools.

3 Claims, 3 Drawing Sheets

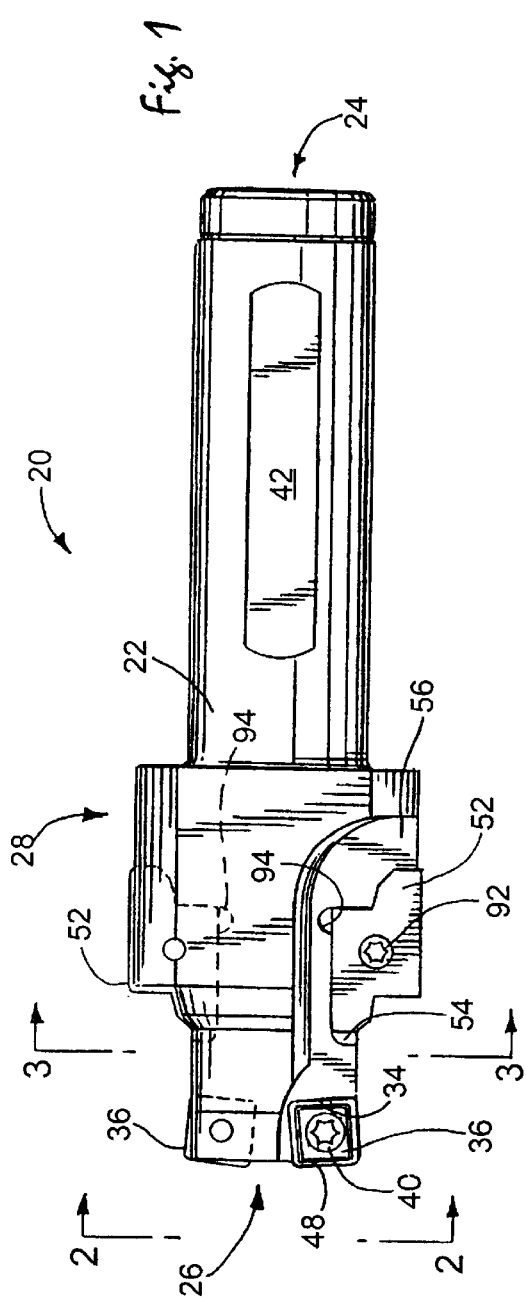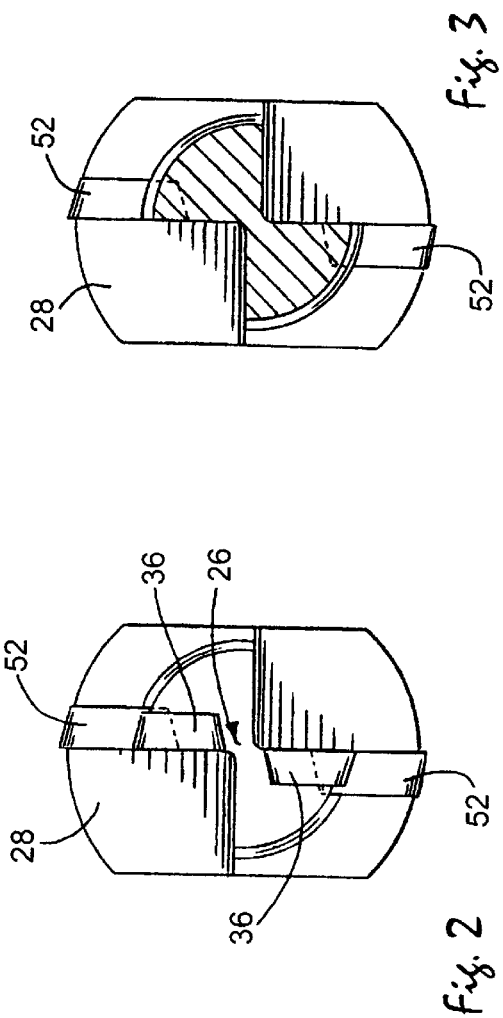

MULTIPLE FUNCTION INSERTS FOR PORT CUTTING TOOL

CROSS-REFERENCE TO RELATED APPLICATION

This is a divisional application of U.S. patent application Ser. No. 08/779,929, filed Jan. 6, 1997, now allowed.

FIELD OF THE INVENTION

The present invention generally relates to cutting tools, and more particularly relates to metal boring tools.

BACKGROUND OF THE INVENTION

In the formation of ports, or bores within metal workpieces, it is often necessary to machine a port having a complex shape. For example, in the formation of ports for hydraulic fluid line couplings, the port needs to provide a conduit for the hydraulic fluid, an area, often threaded, for the fastening of the coupling to the metal workpiece, an annular rim or countersink for receiving an O-ring or similar sealing mechanism, and a spot face or top annular surface which flushly butts up against the hydraulic coupling.

Given the complex shape of such ports, either a number of different tools must be employed to form the ports, or a tool capable of making multiple cuts must be used. If a number of separate tools are used in the formation of the port, the fabrication process is necessarily slowed. Therefore, it is advantageous to combine multiple cutting functions into a single cutting tool.

As a result, such bores are typically formed by a tool performing multiple functions in the form of a cylindrical body which is rotated by a torque producing machine and which is provided with cutting surfaces at various cutting levels or stations along the cylindrical body. The cutting surfaces can either be machined directly into the cylindrical body, or can be provided in the form of indexable cutting inserts. A pilot hole is initially formed in the metal workpiece, and then the porting tool rotatingly penetrates the pilot hole, with the smallest diameter cutting surface enlarging or boring the diameter of the pilot hole, and the other, larger diameter, cutting surfaces providing annular channels, countersinks or spot faces in the port for the aforementioned reasons.

Such prior art devices are disclosed in Benhase, U.S. Pat. Nos. 4,505,626 and 4,531,867 which use cylindrical bodies having three distinct cutting inserts attached thereto. One cutting insert is provided at the smallest diameter portion of the body to bore the pilot hole and enlarge its diameter, the second cutting insert is provided in a next larger diameter section of the cylindrical body to provide a countersink in the bore, and a third cutting insert is provided at the largest diameter portion of the cylindrical body to provide a spot face after the bore has been bored and countersunk. In addition to the fact that such a device requires three separate cutting inserts, its axial feed rate, or the rate at which it can produce bores, is limited in that it takes a full revolution of the tool to make a full circumferential cut through the bore.

In addition to the relatively limited axial feed rate of prior art devices, the use of cutting inserts that are radially disposed about the circumference of the cylindrical body, and which do not extend across the entire diameter of the shaft, results in chatter or deflection of the shaft as it advances through a workpiece. This phenomenon is due to the fact that as the tool engages the workpiece, the cutting insert is confronted with radial forces tending to push the shaft out of perfect rotational movement about its longitudinal axis. Since the ports formed by these tools are often used to receive hydraulic couplings conveying pressurized hydraulic fluid, the dimensions of the bore must be precise to allow for a complete and accurate seal between the coupling and the metal workpiece as well as a complete compression of the O-ring or other sealing mechanism. With the prior art devices mentioned above, the deflection of the rotating tool often results in undersized bores, and the chatter often results in ridged or undulating surfaces in the bore, both of which detrimentally affect the attainment of these objectives.

SUMMARY OF THE INVENTION

A primary aim of the present invention is to provide a porting tool for use in forming ports within metal workpieces which is capable of forming complex shapes at a faster pace and with more dimensional accuracy.

An objective of the present invention is to provide a porting tool with cutting inserts capable of performing multiple cutting functions.

Another objective is to provide a porting tool with improved balance and reduced deflection to thereby result in a more accurately formed port adhering to closer physical tolerances.

A still further objective of the present invention is to provide a porting tool with an increased axial feed rate as compared to prior art porting tools.

In accordance with these objectives, it is a feature of the present invention to provide a porting tool with at least two substantially identical cutting inserts substantially equidistantly spaced around the circumference of the tool which therefore results in tool capable of forming complex ports at a faster pace and with greater dimensional accuracy. As the tool axially advances through the workpiece, the radial forces thereby generated are equal in strength, and directed so as to counterbalance each other. This substantially reduces deflection and chatter, and is in stark contrast to prior art porting tools such as those disclosed above wherein one cutting insert, which only extends across a portion of the tool diameter, is provided at every cutting station and therefore is confronted with an unopposed radial force as the tool advances through the workpiece. This tends to cause chatter and deflection of the tool which results in undersized or deformed ports often having a smaller diameter than that which is desired and required.

It is yet another feature of the present invention to provide a porting tool with more than one cutting insert provided at each cutting level to thereby improve the axial feed rate. Whereas prior art devices only provide one cutting insert at each cutting station which requires a full revolution of the tool to make a full cut in a workpiece, the present invention uses at least two inserts provided at every given cutting station. Therefore, if two inserts are provided the tool only requires one-half revolution to make a full cut, whereas if three inserts were used, only a third of the revolution is required, and so forth. By providing multiple inserts in a substantially equidistantly spaced relationship around the circumference of the tool, not only are the radial forces resulting from the tool moving through the workpiece balanced and the deflection of the tool substantially reduced, but the axial feed rate is correspondingly increased.

It is a still further feature of the present invention to provide a porting tool having a cylindrical body with a shank end and a drilling tip end, at least two cutting inserts for boring a pilot hole provided at the smallest diameter portion of the shaft and substantially equidistantly spaced about the circumference of the shaft, and two other inserts provided in the large diameter portion of the shaft for combining the functions of countersinking and spot facing. The two inserts at the large diameter portion are provided in substantially equidistant relationship around the circumference of the shaft.

It is still another feature of the present invention to provide a cutting insert which combines the functions of creating a countersink with the function of creating the spot face. The cutting insert is indexable in that it can be removed and reversed to use alternative cutting surfaces in the event the first set of cutting surfaces becomes dulled or unusable.

These and other objectives and features of the invention will become more apparent from the following detailed description when taken in conjunction with the accompanying drawings.

BRIEF DESCRIPTION OF THE DRAWINGS

FIG. 1 is a side elevational view of a porting tool embodying the present invention;

FIG. 2 is an end view of the embodiment shown in FIG. 1 taken along line 2—2;

FIG. 3 is a partial sectional view of the embodiment shown in FIG. 1 taken along line 3—3;

Figure 4:
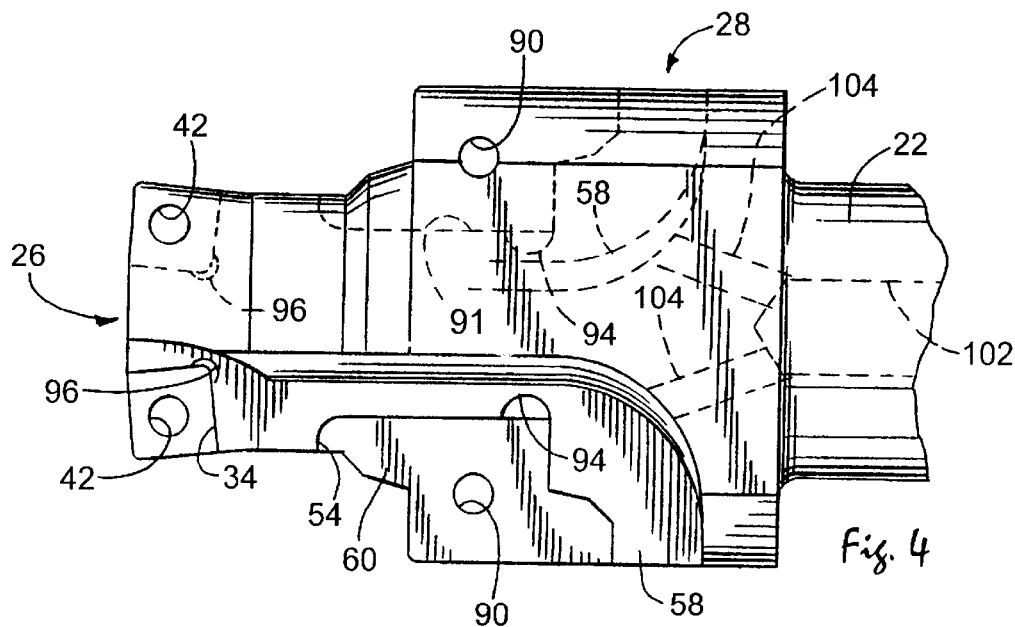
FIG. 4 is a fragmentary side elevational view of the present invention with the cutting inserts removed.

While the present invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the present invention as defined by the appended claims.

DETAILED DESCRIPTION OF THE PREFERRED EMBODIMENT

Referring first to FIG. 1, the preferred embodiment of porting tool 20 is shown having cylindrical body 22 with shank end 24 and opposite tip end 26. Enlarged diameter section 28 is provided therebetween, the purpose and function of which will be discussed with further detail herein. Shank end 24 is provided with flattened surface 42 to facilitate attachment of tool 20 to a torque producing device or spindle (not shown).

As best shown in FIG. 4, tip end 26 is provided with, in the preferred embodiment, a pair of diametrically opposed pockets 34 which are shaped to receive lower, boring inserts 36. As can be seen from FIGS. 1 and 5, boring inserts 36 are substantially square in the preferred embodiment with pockets 34 being correspondingly shaped to receive inserts 36. It is to be understood that boring inserts 36 are conventional in nature and are indexable in that all four sides 38 are usable as the active cutting edge and that alternative embodiments may employ boring inserts 36 which have a different number of sides. For example, triangular, or trigon, shaped inserts are usable as the boring inserts with the present invention. To alternate from one active cutting edge 38 to the next, fastener 40 is removed, boring insert 36 is removed and rotated, and fastener 40 is reattached. Tip end 26 of tool 20 is provided with apertures 42 which are threaded to receive fastener 40. In addition, boring inserts 36 are provided with countersunk bore 44 to receive fastener 40. Disposed on cutting face 46 and along each side 38, a chip-breaking groove 48 is provided. As is conventional, groove 48 provides a mechanism by which the metal removed from workpiece 100 is segmented. Otherwise, a long, ribbon-like waste metal material would result and potentially interfere with the proper rotation of tool 20.

Figures 5, 6:
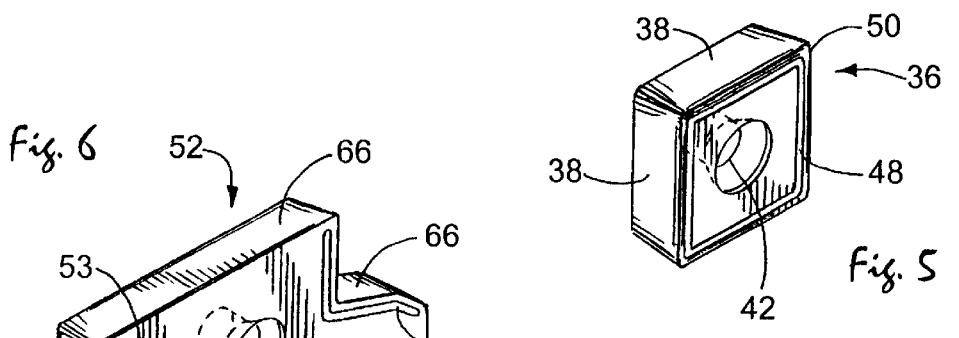
FIG. 5 is a perspective view of the lower or boring insert.
FIG. 6 is a perspective view of the upper or multiple function insert.

Boring inserts 36 are provided to enlarge the diameter of a pilot hole and cleanly form a cylindrical bore for the port. The actual cutting performed by boring inserts 36 is performed along edge 50 where sides 38 meet cutting face 41, as shown in FIG. 5. Since inserts 36 are diametrically opposed and identical in the preferred embodiment, a full 360° circumferential cut is performed with each one-half revolution of tool 20. This is a substantial improvement in axial feed rate over prior art porting tools which require a full revolution to make the same cut.

In accordance with the present invention, and referring now to FIG. 4, enlarged diameter section 28 is shown in detail. Substantially identical multiple function inserts 52 (FIG. 1) are provided in substantially diametric opposition, and as will be described with further detail herein, are provided with dedicated edges for performing the countersinking and spot facing functions. By providing two diametrically opposed and identical inserts 52 and combining the countersinking and spot facing functions into insert 52, a 360° countersunk cut and a 360° spot face cut are made with each one-half revolution of tool 20 and its two multiple function inserts 52, which necessarily results in an improved axial feed rate, and improved dimensional accuracy. It is to be understood that the inserts need not be exactly diametrically opposed and that for the sake of reducing tool chatter, the inserts may actually be slightly out of diametric opposition.

Figure 7:
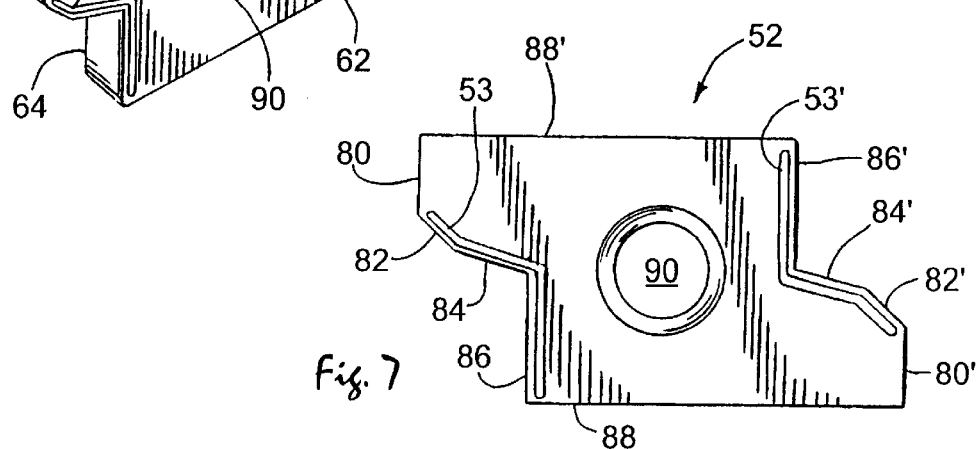
FIG. 7 is a plan view of the insert shown in FIG. 6.

The aforementioned dedicated edges of multiple function insert 52 are best shown in FIGS. 6 and 7, wherein the preferred embodiment of multiple function insert 52 is shown comprised of cutting face 62, back face 64, and ten sides 66. It will be appreciated by those of skill in the art that although insert 52 has ten sides, only three of the sides will be used as cutting edges at any given time. It will also be appreciated by those of ordinary skill in the art that alternative embodiments of insert 52 could include fewer sides or differently configured sides depending on the configuration of the port to be formed. In addition, each insert 52 in the preferred embodiment is provided with a pair of chip-breaking grooves 53 and 53' which serve the same function as grooves 48 in conjunction with inserts 36. Other embodiments could be fabricated without grooves 53 and 53'.

Figure 8:
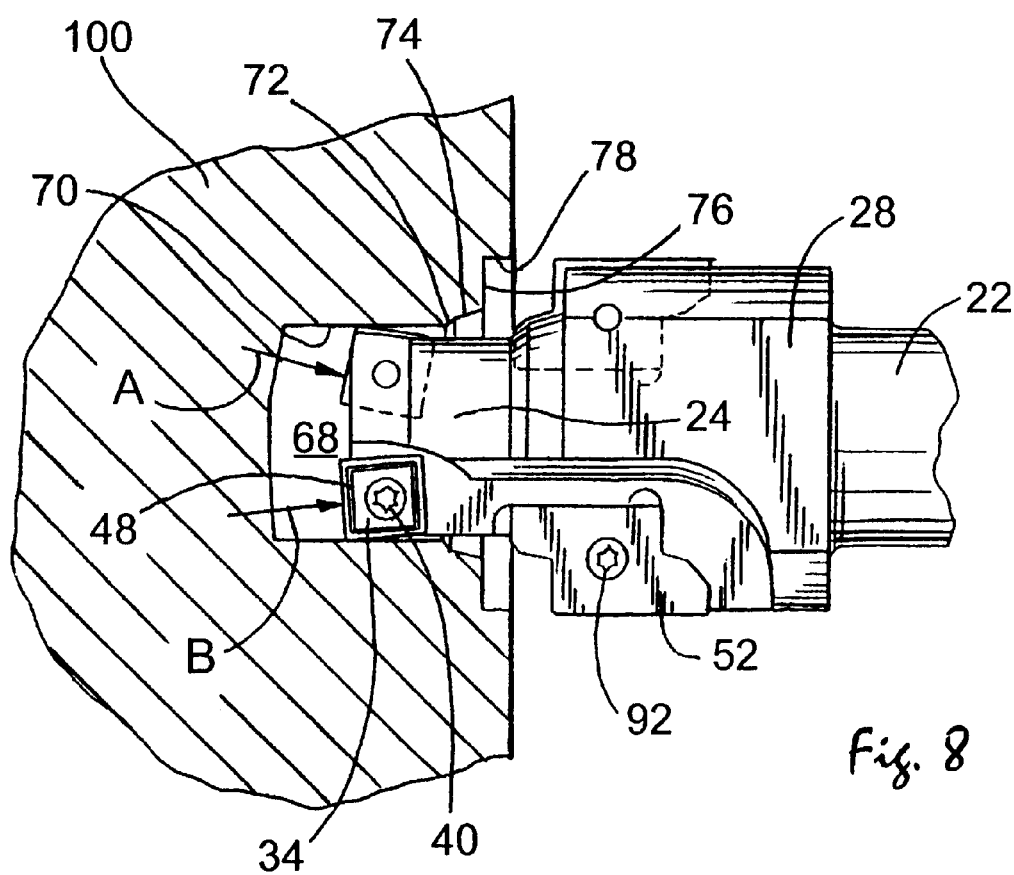
FIG. 8 is a side elevational view of the present invention being removed from a port just formed by the present invention.

As shown in FIG. 8, port 68, which is formed by tool 20, is comprised of cylindrical wall 70, leading countersink edge 72, trailing countersink edge 74, spot face 76 and annular rim 78. Each of these surfaces must be formed by either boring inserts 36 or multiple function inserts 52. Those of ordinary skill in the art will clearly understand that as tool 20 rotates, cylindrical cavity 70 is formed by boring inserts 36 while leading countersink edge 72, trailing countersink edge 74, spot face 76, and annular rim 78 are formed by multiple function inserts 52.

FIG. 7 shows the edges of multiple function inserts 52 which form each of these surfaces. First edge 80 does not perform any cutting function, but as shown in FIG. 1, is entirely seated within upper pockets 54. Second edge 82 forms leading countersink edge 72, third edge 84 forms trailing countersink edge 74, fourth edge 86 forms spot face 76, and fifth edge 88 does not perform any cutting function, rather annular rim 78 is formed as a result of fourth edge 86 forming spot face 76. However, since inserts 52 are indexable, fifth edge 88 has an identical counterpart 88' which does seat against retaining wall 91 of upper pocket 54 as shown in FIGS. 1 and 8. Similarly, fourth edge 86' seats against retaining wall 93 of upper pocket 54 to firmly and accurately position multiple function inserts 52 within upper pocket 54. Otherwise multiple function inserts 52 might be free to rotate about fastener 92. It is to be understood that edges 82', 84', and 86' could become active cutting edges simply by removing fastener 92, rotating insert 52, and securing fastener 92.

In the preferred embodiment, tool 20 also includes first and second flutes 56 and 58 which extend from tip end 26 through enlarged diameter section 28. Alternative embodiments could include three or more flutes which are substantially equidistantly spaced apart depending on the number of inserts to be provided at each cutting level. For example, with a three insert embodiment, three flutes would be provided with each flute being spaced approximately 120° apart. However, the actual angular spacing could vary slightly to minimize chatter. One upper pocket 54 and one lower pocket 30 are each formed in flutes 56 and 58. As best shown in FIG. 4, tapered section 60 is provided between tip end 26 and enlarged diameter 28 to provide for adequate support for multiple function inserts 52.

Although not of importance to the present invention, for the sake of completeness it should be noted that upper pocket 54 includes semi-circular channel 94, and that lower pockets 30 includes semi-circular channel 96. Channels 94 and 96 exist as a result of the manner in which the present invention is manufactured. In order to form pockets 30 and 54, a rotating cutting tool is used to machine the metal away from flutes 56 and 58. Since a rotating cutting tool cannot form a right angle, the cutting tool is positioned past the actual required depth of the pockets to adequately form the required space.

Referring now to FIGS. 2 and 3, it can be seen that boring inserts 36 and multiple function inserts 52 are substantially diametrically opposed in the preferred embodiment. It can also be seen that flutes 56 and 58 are each provided with apertures 42 and 90 which receive fasteners 40 and 92, respectively, to secure the inserts to body 22. From FIGS. 2 and 3 it can be seen that sides 38 of boring inserts 36 and that edges 80, 82, 84, 86, and 88 of multiple function inserts 52 are not exactly perpendicular to the opposed faces of the inserts, but rather taper from the cutting face 62 to the back face 64 to form a more effective cutting edge.

When tool 20 is in operation, the interaction between the inserts and the workpiece generates heat and fragmented metal. It is therefore necessary to provide a mechanism by which both can be removed. With the present invention, this heat and waste removal mechanism is provided in the form of central conduit 102 and tributaries 104. As best shown in FIG. 4, tributaries 104 communicate from central conduit 102 and exit into flutes 56 and 58. In operation, tool 20 can be provided with a source of coolant or lubricant, which is communicated down through central conduit 102 and through tributaries 104 to flutes 56 and 58. The coolant dissipates the heat, lubricates the parts, and provides a means for flushing the removed metal from port 68. Otherwise the particles and fragments of metal removed from workpiece 100 could quickly build up and eventually prevent further rotation of tool 20.

In operation, the function of tool 20 will best be comprehended with reference to FIG. 8. Tool 20 will be attached to a torque producing spindle (not shown) which rotates cylindrical body 22. A pilot hole (not shown) will be provided in workpiece 100 and tool 20 will penetrate the pilot hole with boring inserts 36 enlarging the diameter thereof. Cylindrical cavity 70 will thereby be formed. As tool 20 axially advances further through workpiece 100, second edge 82 of multiple function insert 52, engages workpiece 100 and forms leading countersink edge 72. Similarly, as tool 20 axially advances even further, third edge 84 will form trailing countersink edge 74, and fourth edge 86 will form spot face 76.

As tool 20 is rotating, coolant and lubricant will be communicated through central conduit 102 and through tributaries 104 to flutes 56 and 58. The coolant will dissipate the heat and flush away metal particles cut from workpiece 100.

Since inserts 36 are provided in diametric opposition in the preferred embodiment, the radial forces acting on each (resulting from the inserts engaging the workpiece as the tool axially advances and indicated by reference letters A and B, respectively) will be balanced and tool 20 will not deflect out of a substantially perfect rotational axis. Similarly, the radial forces acting on each insert 52 will be counterbalanced by the radial forces acting on the other insert 52. The dimensional profile of bore 68 will thereby be formed with extremely tight tolerances and will not be undersized as is prevalent with prior art devices. It is to be understood that alternative embodiments may include three or more identical inserts at each cutting level, but that regardless of the number of inserts, the balancing effect will result from the substantially equidistant spacing involved. Therefore, with the preferred embodiment, two inserts are provided at each level approximately 180° apart, whereas with a three insert embodiment, the inserts could be approximately 120° apart, and with a fourth embodiment the inserts would be approximately 90° apart, and so forth.

From the foregoing it will be appreciated that the present invention brings to the art a new and improved porting tool which combines the functions of the countersinking insert and spot facing insert into one indexable insert. The resulting tool is capable of forming ports at a faster pace than the prior art, with more dimensional accuracy. It will be understood that by providing the inserts in substantially diametric opposition or substantially equidistant spacing, the radial forces imparted to the tool as it axially advances through a workpiece will be balanced, and the tool will therefore not tend to deflect out of a perfect rotational axis. By providing at least two inserts at each and every cutting level, the axial feed rate of the resulting tool will be enhanced in that less than one full revolution will be required to form a full circumferential cut within the workpiece. Since the countersinking and spot facing functions are performed by the same insert, identical multifunction inserts can be used as opposed to prior art porting tools which cannot add additional inserts due to space and manufacturability limitations.

What is claimed is:

1. A combined countersinking and spot facing cutting insert for a porting tool comprising a plate having ten sides wherein at least three of the sides form active cutting edges at any given time, and at least two of the three active cutting edges are substantially perpendicular to each other.

2. The cutting insert of claim 1, wherein the insert is indexable.

3. The cutting insert of claim 2, wherein the porting tool is a metal machining porting tool for cutting ports for hydraulic fluid line couplings.

\* \* \* \* \*